United States Patent
Gao

(10) Patent No.: US 9,998,367 B2
(45) Date of Patent: Jun. 12, 2018

(54) COMMUNICATION CONTROL SYSTEM, COMMUNICATION CONTROL METHOD, AND COMMUNICATION CONTROL PROGRAM

(71) Applicant: NEC Corporation, Minato-ku, Tokyo (JP)

(72) Inventor: Fei Gao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

(21) Appl. No.: 15/111,082

(22) PCT Filed: Jan. 21, 2015

(86) PCT No.: PCT/JP2015/000262
§ 371 (c)(1),
(2) Date: Jul. 12, 2016

(87) PCT Pub. No.: WO2015/118822
PCT Pub. Date: Aug. 13, 2015

(65) Prior Publication Data
US 2016/0344625 A1 Nov. 24, 2016

(30) Foreign Application Priority Data
Feb. 5, 2014 (JP) ................. 2014-020390

(51) Int. Cl.
*H04L 12/56* (2006.01)
*H04L 12/753* (2013.01)
(Continued)

(52) U.S. Cl.
CPC .......... *H04L 45/48* (2013.01); *H04L 12/6418* (2013.01); *H04L 45/02* (2013.01);
(Continued)

(58) Field of Classification Search
CPC ......... H04L 45/48; H04L 45/64; H04L 45/12; H04L 45/18; H04L 45/02; H04L 12/56
See application file for complete search history.

(56) References Cited

U.S. PATENT DOCUMENTS 7,869,447 B2  1/2011  Westberg et al.
9,635,705 B2 * 4/2017  Lu ..................... H04W 84/00
(Continued)

FOREIGN PATENT DOCUMENTS

JP   2008-505531 A   2/2008
WO  2009/042919 A2  4/2009
WO  2011/065268 A1  6/2011

OTHER PUBLICATIONS

Nobuhiko Ito et al., "An Efficient Calculation of Passive Type Loop Detection Method and it's Implimentation on OpenFlow-based Network", IEICE Techinical Report, Feb. 25, 2010, vol. 109, No. 448, pp. 31 to 36.

(Continued)

*Primary Examiner* — Wei Zhao

(57) ABSTRACT

An adjacent domain specification means 81 specifies an adjacent controller domain to an own controller domain. A loop solution means 82 creates a communication tree for avoiding a loop configuration present in communication paths with the adjacent controller domain. A topology specification means 83 specifies a network topology between the controller domains. A communication control means 84 calculates an optimum path based on the communication tree by use of the network topology, and controls communication from a communication device connected to each OpenFlow switch.

6 Claims, 10 Drawing Sheets

(51) Int. Cl.
*H04L 12/64* (2006.01)
*H04L 12/751* (2013.01)
*H04L 12/721* (2013.01)
*H04L 12/705* (2013.01)
*H04L 12/715* (2013.01)

(52) U.S. Cl.
CPC .............. *H04L 45/04* (2013.01); *H04L 45/12* (2013.01); *H04L 45/18* (2013.01); *H04L 45/64* (2013.01)

(56) References Cited

U.S. PATENT DOCUMENTS

| | | | |
|---|---|---|---|
| 2003/0179707 A1* | 9/2003 | Bare | H04L 12/185 370/235 |
| 2006/0018300 A1 | 1/2006 | Westberg et al. | |
| 2006/0268871 A1* | 11/2006 | Van Zijst | H04L 12/1836 370/390 |
| 2013/0108264 A1 | 5/2013 | Deruijter et al. | |
| 2013/0279909 A1 | 10/2013 | Srinivas et al. | |
| 2014/0334286 A1 | 11/2014 | Ernstrom et al. | |

OTHER PUBLICATIONS

International Search Report for PCT Application No. PCT/JP2015/000262 dated Apr. 14, 2015.
Written opinion for PCT Application No. PCT/JP2015/000262.
Extended European Search Report for EP Application No. EP15745896.9 dated Sep. 20, 2017.

* cited by examiner

FIG. 3

| OFCND(OFCNAD) | | |
|---|---|---|
| Type | | NAD(Neighbor Advertise) |
| Node ID | | ON(Original Node) |
| | OFC Domain ID | TRANSMISSION OWN OFC DOMAIN ID |
| | OFS Domain ID | TRANSMISSION OFS DOMAIN ID |
| | OFS ID | TRANSMISSION OFS ID |
| | OFS Port ID | TRANSMISSION OFS Port ID |
| | Post Link Cost | TRANSMISSION Port Link Cost |

FIG. 4

| OFCND(OFCNRS) | | |
|---|---|---|
| Type | | NRS(Neighbor Response) |
| Node ID | | ON(Original Node) |
| | OFC Domain ID | NAD RECEPTION Neighbor OFC DOMAIN ID |
| | OFS Domain ID | NAD RECEPTION Neighbor OFS DOMAIN ID |
| | OFS ID | NAD RECEPTION Neighbor OFS ID |
| | OFS Port ID | NAD RECEPTION Neighbor OFS Port ID |
| | Post Link Cost | NAD RECEPTION Neighbor Port Link Cost |
| Node ID | | NN(Neighbor Node) |
| | OFC Domain ID | OWN OFC DOMAIN ID |
| | OFS Domain ID | TRANSMISSION OFS DOMAIN ID |
| | OFS ID | TRANSMISSION OFS ID |
| | OFS Port ID | TRANSMISSION OFS Port ID |
| | Post Link Cost | TRANSMISSION Port Link Cost |

FIG. 5

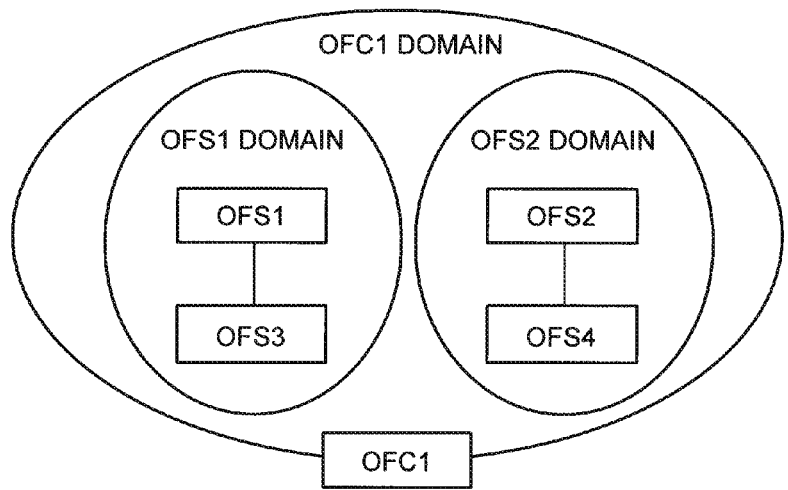

FIG. 6

| OFCTDDU(OFC Topology Discovery Data Unit) | | |
|---|---|---|
| Node ID | | 0 |
| | OFC Domain ID | TRANSMISSION OFC DOMAIN ID |
| | OFS Domain ID | TRANSMISSION OFS DOMAIN ID |
| | OFS ID | TRANSMISSION OFS ID |
| | OFS Port ID | TRANSMISSION OFS Port ID |
| | Post Link Cost | TRANSMISSION Port Link Cost |
| Node ID | | 1 |
| | OFC Domain ID | FORWARDING OFC DOMAIN ID |
| | OFS Domain ID | FORWARDING OFS DOMAIN ID |
| | OFS ID | FORWARDING OFS ID |
| | OFS Port ID | FORWARDING OFS Port ID |
| | Post Link Cost | FORWARDING Port Link Cost |
| ... | | |
| Node ID | | n |
| | OFC Domain ID | FORWARDING OFC DOMAIN ID |
| | OFS Domain ID | FORWARDING OFS DOMAIN ID |
| | OFS ID | FORWARDING OFS ID |
| | OFS Port ID | FORWARDING OFS Port ID |
| | Post Link Cost | FORWARDING Port Link Cost |

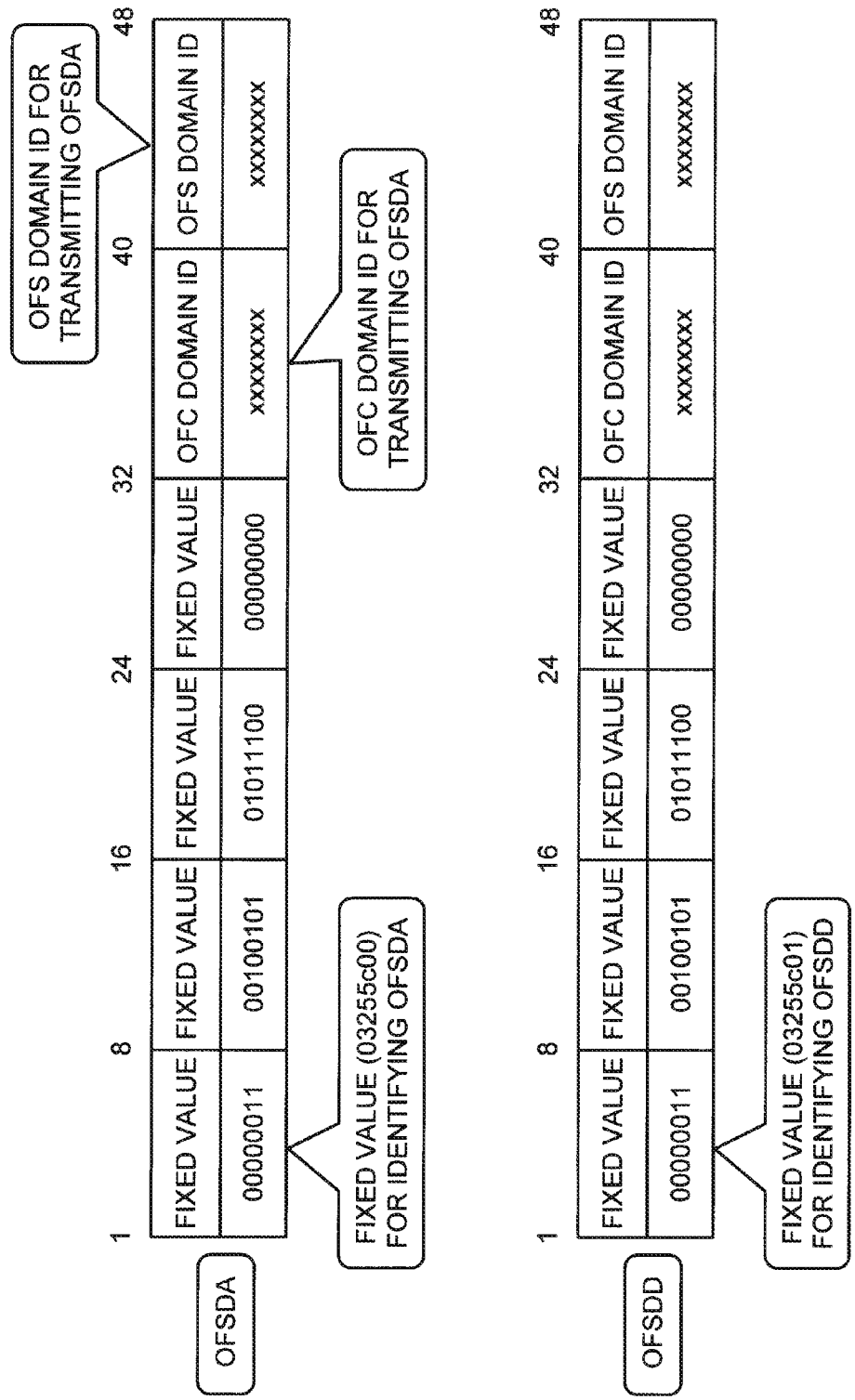

COMMUNICATION CONTROL SYSTEM, COMMUNICATION CONTROL METHOD, AND COMMUNICATION CONTROL PROGRAM

This application is a National Stage Entry of PCT/JP2015/000262 filed on Jan. 21, 2015, which claims priority from Japanese Patent Application 2014-020390 filed on, Feb. 5, 2014, the contents of all of which are incorporated herein by reference, in their entirety.

TECHNICAL FIELD

The present invention relates to a communication control system for controlling communication among controllers for managing a plurality of communication devices, a communication control method, and a communication control program.

BACKGROUND ART

OpenFlow is widely known as a technique for intensively managing a plurality of communication units by one control device. In OpenFlow, an OpenFlow Controller (denoted as OFC below) controls one or more OpenFlow Switches (denoted as OFS below). In recent years, there are increasing demands that an OpenFlow network is managed by a plurality of OFCs in consideration of the number of OFSs controllable by OFCs or the installation locations of the OFSs.

Patent Literature 1 describes a load distribution system enabling loads on a controller to be distributed also in a combination between switches and controller not having their own load distribution function or a combination between switches and controller not having compatible load distribution function due to different manufacturers. In the load distribution system described in Patent Literature 1, a proxy is installed between switches and controllers, the proxy notifies connection with one switch to a plurality of controllers, determines a master controller for the switch, and transfers an inquiry message from the switch to only the one master controller.

CITATION LIST

Patent Literature

PTL 1: Re-publication of PCT International Publication WO2011-065268

SUMMARY OF INVENTION

Technical Problem

Generally, an OFC detects its managing topology without regarding to a link with a group of OFSs managed by other OFC. A group of OFSs managed by an OFC will be denoted as OFC domain below. That is, an OFC controls BCMC (Broadcast and Multicast), Unknown unicast, or Unicast transfer by an OpenFlow protocol based on an own OFC domain topology detected per OFC. However, when an OFC detects and controls only the own OFC domain, the following problems are led.

FIG. 11 is an explanatory diagram illustrating an example that two OFC domains are connected via a plurality of lines. In the example illustrated in FIG. 11, an OFC1 domain 110 and an OFC2 domain 120 are connected via a line C41 and a line C42. The OFC1 domain 110 is managed by OFC1, and the OFC2 domain 120 is managed by OFC2.

The OFC1 domain 110 includes four OFSs (OFSs 1 to 4). In the OFC1 domain 110, OFS1 and OFS2 are connected via a line C11, OFS1 and OFS3 are connected via a line C12, OFS2 and OFS4 are connected via a line C13, and OFS3 and OFS4 are connected via a line C14. Further, a client PC (Personal Computer) 210 is connected to OFS1 in the OFC1 domain 110.

The OFC2 domain 120 also includes four OFSs (OFSs1 to 4). In the OFC2 domain 120, OFS1 and OFS2 are connected via a line C21, OFS1 and OFS3 are connected via a line C22, OFS2 and OFS4 are connected via a line C23, and OFS3 and OFS4 are connected via a line C24.

OFC1 detects (discovers) a topology of the OFC1 domain 110, and OFC2 detects (discovers) a topology of the OFC2 domain 120. Further, a logic spanning tree is constructed such that OFC1 shuts down (blocks) the line C14 in its domain, and OFC2 shuts down (blocks) the line C23 in its domain.

Under the environment illustrated in FIG. 11, even when a BCMC packet is transmitted from the PC 210, the BCMC packet is not looped within each OFS domain.

However, the line C41, the line C22, the line C42, and the line C13 are not shut down, and thus a loop is caused via the lines over the OFC domains. Therefore, a BCMC storm can occur in the entire system illustrated in FIG. 11.

A technique called MCLAG (Multi-Chassis Link Aggregation Group) is known as a method for solving the problem. With the use of the technique, the line C41 and the line C42 can be logically handled as one link, and thus a loop illustrated in FIG. 11 can be prevented from occurring.

However, even with the use of the MCLAG technique, a loop is difficult to avoid in a network in which three or more OFC domains are connected. FIG. 12 is an explanatory diagram illustrating an example that three OFC domains are connected.

In the example illustrated in FIG. 12, an OFC3 domain 130 is present in addition to the OFC1 domain 110 and the OFC2 domain 120. The OFC3 domain 130 is managed by OFC3. The OFC1 domain 110 and the OFC3 domain 130 are connected via a line C43, and the OFC2 domain 120 and the OFC3 domain 130 are connected via a line C44.

The OFC3 domain 130 also includes four OFSs (OFSs 1 to 4). OFS1 and OFS2 are connected via a line C31, OFS1 and OFS3 are connected via a line C32, OFS2 and OFS4 are connected via a line C33, and OFS3 and OFS4 are connected via a line C34. Further, in the example illustrated in FIG. 12, the OFC1 domain 110 and the OFC2 domain 120 are connected via MCLAG created using the line C41 and the line C42.

In this case, a BCMC packet transmitted from PC1 is looped among the OFC1 domain 110, the OFC2 domain 120, and the OFC3 domain 130 via a link made of the MCLAG created using the line C41 and the line C42, the line C43, and the line C44. Therefore, a BCMC storm can occur in the entire system illustrated in FIG. 12.

As described above, it is difficult to redundantly configure connection among a plurality of OFC domains in a typical communication network. Therefore, it is desirable to construct a topology for eliminating a loop configuration in consideration of a link among all the OFC domains.

The load distribution system described in Patent Literature 1 does not assume the situation. Therefore, even under an OpenFlow network environment using a plurality of OFCs, it is desirable to distribute loads of communication over OFC domains into a plurality of paths and to calculate an optimum path.

It is therefore an object of the present invention to provide a communication control system capable of making communication by use of an optimum path without looping communication even when a physical loop is present among a plurality of connected OFC domains under an OpenFlow network environment, a communication control method, and a communication control program.

Solution to Problem

A communication control system of the present invention is for controlling communication among controller domains in a network in which the controller domains, each of which indicates a range in which at least one or more OpenFlow switch is managed by each OpenFlow controller, are mutually connected, the communication control system including: an adjacent domain specification means which specifies an adjacent controller domain to an own controller domain; a loop solution means which creates a communication tree for avoiding a loop configuration present in communication paths with the adjacent controller domain; a topology specification means which specifies a network topology between controller domains; and a communication control means which calculates an optimum path based on the communication tree and controls communication from a communication device connected to each OpenFlow switch by use of the network topology.

Another communication control system of the present invention is for controlling communication among controller domains in a network in which the controller domains, each of which indicates a range in which at least one or more OpenFlow switch is managed by each OpenFlow controller, are mutually connected, the communication control system including: a plurality of OpenFlow controllers; and a topology manager connected such that communication from the OpenFlow controllers reaches, and directed for creating a communication tree indicating communication paths among the controller domains, wherein the OpenFlow controller includes an adjacent domain specification means which specifies an adjacent controller domain to an own controller domain, an adjacent domain information transmission means which transmits the information on the specified adjacent controller domain to the topology manager, and a communication control means which calculates an optimum path based on the network topology calculated by the topology manager, and controls communication from a communication device connected to each OpenFlow switch, and the topology manager includes a communication tree creation means which specifies a network topology between controller domains based on the information received from the OpenFlow controllers, and creates a communication tree for avoiding a loop configuration present in communication paths with the adjacent controller domain, and a network topology distribution means which distributes the created communication tree to the OpenFlow controllers.

A communication control method of the present invention is for controlling communication among controller domains in a network in which the controller domains, each of which indicates a range in which at least one or more OpenFlow switch is managed by each OpenFlow controller, are mutually connected, the communication control method including: specifying an adjacent controller domain to an own controller domain; creating a communication tree for avoiding a loop configuration present in communication paths with the adjacent controller domain; specifying a network topology between controller domains; and calculating an optimum path based on the communication tree and controlling communication from a communication device connected to each OpenFlow switch by use of the network topology.

A communication control program of the present invention is applied to a computer for controlling communication among controller domains in a network in which the controller domains, each of which indicates a range in which at least one or more OpenFlow switch is managed by each OpenFlow controller, are mutually connected, the communication control program causing the computer to perform: adjacent domain specification processing of specifying an adjacent controller domain to the own controller domain; loop solution processing of creating a communication tree for avoiding a loop configuration present in communication paths with the adjacent controller domain; topology specification processing of specifying a network topology between controller domains; and communication control processing of calculating an optimum path based on the communication tree and controlling communication from a communication device connected to each OpenFlow switch by use of the network topology.

Advantageous Effects of Invention

According to the present invention, it is possible to make communication by use of an optimum path without looping the communication even when a physical loop is present among a plurality of connected OFC domains under an OpenFlow network environment.

BRIEF DESCRIPTION OF DRAWINGS

FIG. 3 It depicts an explanatory diagram illustrating exemplary information propagated by an OFCND packet with a packet type of NAD.

FIG. 4 It depicts an explanatory diagram illustrating exemplary information propagated by an OFCND packet with a packet type of NRS.

FIG. 5 It depicts an explanatory diagram illustrating a state in which an OFC controls a plurality of groups of OFSs.

FIG. 6 It depicts an explanatory diagram illustrating an exemplary OFCTDDU packet.

FIG. 7 It depicts an explanatory diagram illustrating an OFSDA packet and an OFSDD packet by way of example.

DESCRIPTION OF EMBODIMENTS

Exemplary embodiments of the present invention will be described below with reference to the drawings.

First Exemplary Embodiment

Figure 1:
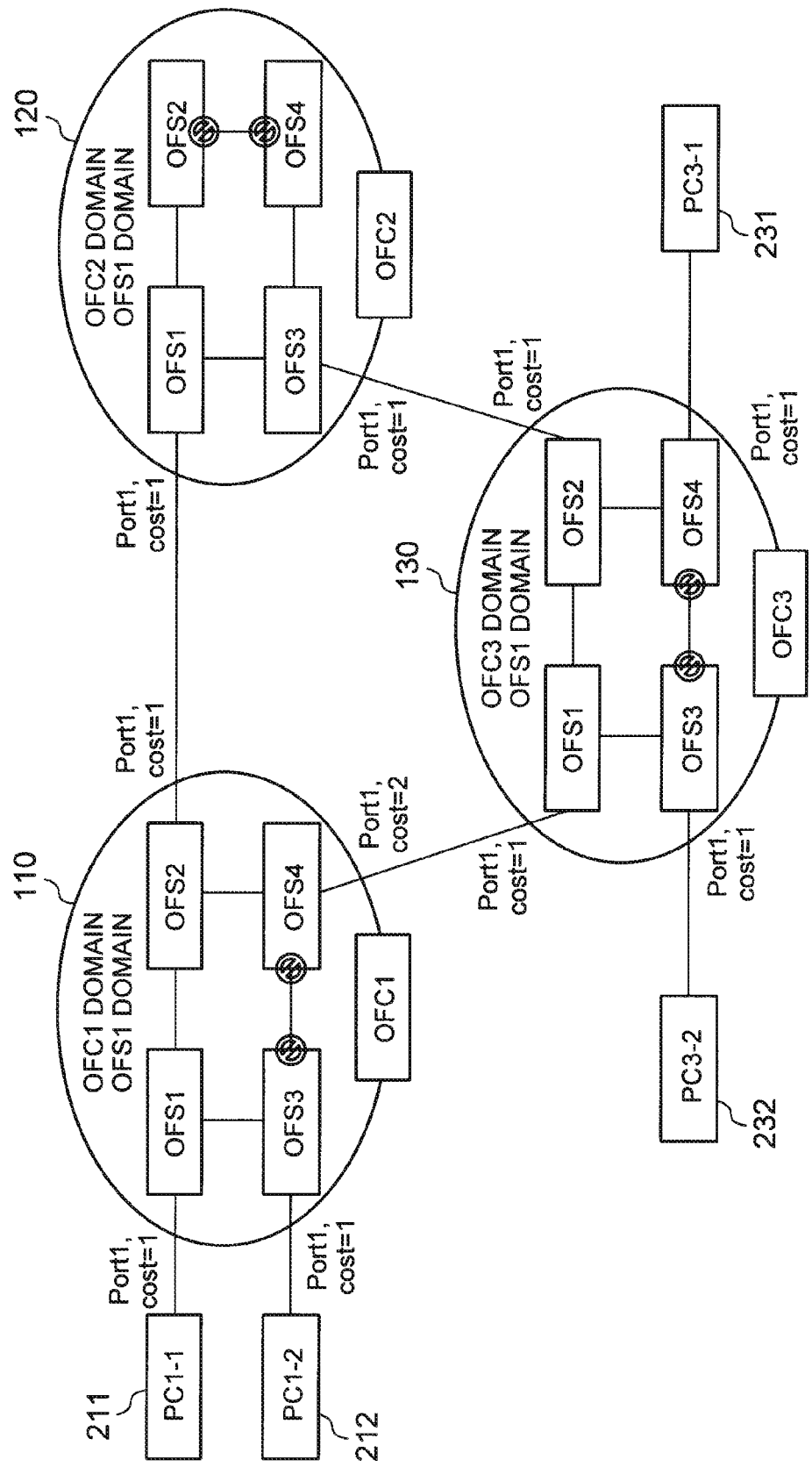
FIG. 1 It depicts a block diagram illustrating an exemplary structure of a communication control system according to a first exemplary embodiment of the present invention.
Figure 2:
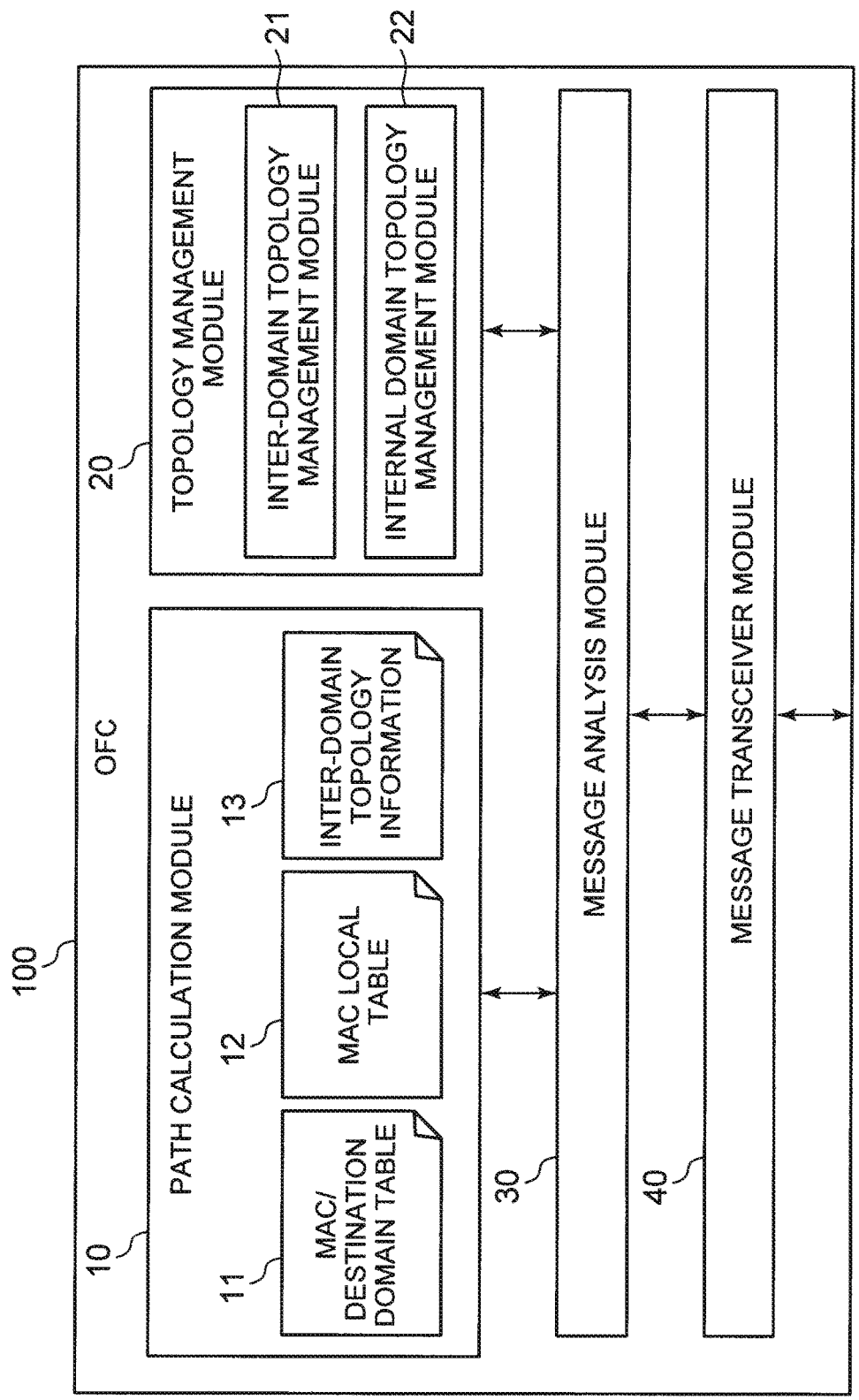
FIG. 2 It depicts a block diagram illustrating an exemplary structure of an OFC used in the communication control system according to the present exemplary embodiment.

FIG. 1 is an explanatory diagram illustrating an exemplary structure of a communication control system according to a first exemplary embodiment of the present invention. FIG. 2 is a block diagram illustrating an exemplary structure of an OFC used in the communication control system according to the present exemplary embodiment. The following description assumes that three OFC domains (OFC domains 110, 120, and 130) and four OFSs managed by the OFC in each OFC domain are included in a communication network. That is, the environment described below is a multi-controller environment including three OFCs.

The number of OFC domains included in the communication control system is not limited to three, and may be four or more. Further, the number of OFSs included in each OFC domain is not limited to four, and may be one to three, or five or more.

In the communication control system illustrated in FIG. 1, a PC 211 is connected to port1 of OFS1 included in the OFC1 domain 110 at cost=1, and a PC 212 is connected to port1 of OFS3 included in the OFC1 domain 110 at cost=1. Further, a PC 231 is connected to port1 of OFS4 included in the OFC3 domain 130 at cost=1, and a PC 232 is connected to port1 of OFS3 included in the OFC3 domain 130 at cost=1.

Further, port1 of OFS2 included in the OFC1 domain 110 is connected to port1 of OFS1 included in the OFC2 domain 120 at cost=1, and port1 of the OFS1 included in the OFC2 domain 120 is connected to port1 of OFS2 included in the OFC1 domain 110 at cost=1. Further, port1 of OFS4 included in the OFC1 domain 110 is connected to port1 of OFS1 included in the OFC3 domain 130 at cost=2, and port1 of OFS1 included in the OFC3 domain 130 is connected to port1 of OFS4 included in the OFC1 domain 110 at cost=1. Further, port1 of OFS3 included in the OFC2 domain 120 is connected to port1 of OFS2 included in the OFC3 domain 130 at cost=1, and port1 of OFS2 included in the OFC3 domain 130 is connected to port1 of OFS3 included in the OFC2 domain 120 at cost=1.

FIG. 2 illustrates a functional module structure of an OFC according to the present exemplary embodiment. An OFC 100 illustrated in FIG. 2 controls an OFC domain. The OFC 100 illustrated in FIG. 2 corresponds to OFC1, OFC2, and OFC3 illustrated in FIG. 1. The OFC 100 includes a path calculation module 10, a topology management module 20, a message analysis module 30, and a message transceiver module 40.

The message transceiver module 40 is a module for exchanging OpenFlow messages.

The message analysis module 30 analyzes an OpenFlow message received from the message transceiver module 40 and notifies it to the higher-order modules (the path calculation module 10 and the topology management module 20). Further, the message analysis module 30 converts an OFS control message issued from the higher-order modules (the path calculation module 10 and the topology management module 20) into an OpenFlow message to be notified to the message transceiver module 40.

The topology management module 20 includes an inter-domain topology management module 21 and an internal domain topology management module 22.

The topology management module 20 (more specifically, the inter-domain topology management module 21 and the internal domain topology management module 22) is realized by the CPU in a computer operating according to a program (communication control program). For example, the program is stored in a storage unit (not illustrated) in the OFC 100 and the CPU reads the program and may operate as the topology management module 20 (more specifically, the inter-domain topology management module 21 and the internal domain topology management module 22) according to the program.

The inter-domain topology management module 21 and the internal domain topology management module 22 may be realized in dedicated hardware, respectively. Further, the series of processing performed by the inter-domain topology management module 21 and the internal domain topology management module 22, respectively, may be collectively performed by the topology management module 20.

The internal domain topology management module 22 searches a topology in the OFC domain and keeps the topology. A method for searching a topology in an OFC domain is different per mounted OFC, but the internal domain topology management module 22 may search a topology and keep the topology in a well-known method. Herein, a method for searching and keeping a topology in an OFC domain managed by an OFC will not be described in detail.

The inter-domain topology management module 21 searches a topology between OFC domains and keeps the topology. Further, the inter-domain topology management module 21 notifies the information on the searched topology to the path calculation module 10.

The path calculation module 10 includes a MAC (Media Access Control)/destination domain table storage unit 11, a MAC local table storage unit 12, and an inter-domain topology information storage unit 13. The MAC/destination domain table storage unit 11, the MAC local table storage unit 12, and the inter-domain topology information storage unit 13 are realized by memory, magnetic disk, or the like, for example. Further, the path calculation module 10 is realized by the CPU in the computer operating according to the program (communication control program).

The inter-domain topology information storage unit 13 holds topology information between OFC domains in the entire system notified from the inter-domain topology management module 21.

The MAC local table storage unit 12 holds MAC information learned in its OFC domain. The MAC information is updated by movement or disappearance of an OFS in the OFC domain, or new learning. When the MAC information disappears or new MAC information is learned, the topology management module 20 floods OFCSDA (OFC Source Domain Advertise) to other OFC domains.

The MAC/destination domain table storage unit 11 stores a MAC/destination domain table generated based on the information (such as OFCSDA) collected from other OFC domains.

The series of processing performed by the inter-domain topology management module 21 will be specifically described below.

(1) Neighbor Discovery Stage

The inter-domain topology management module 21 specifies an OFC domain adjacent to its OFC domain, and notifies the specified OFC domain to the OFCs in other OFC domains. The inter-domain topology management module 21 uses an OFCND (OFC Neighbor Discovery) packet in order to search an adjacent OFC domain.

The type of packets transmitted from the OFC domain to other OFC domains among the OFCND packets is identified by NAD (Neighbor Advertise), and the type of packets from other OFC domains to the OFC domain is identified by NRS (Neighbor Response). In the following description, the OFCND packet with a packet type of NAD may be denoted as OFCNAD packet, and the OFCND packet with a packet type of NRS may be denoted as OFCNRS packet.

FIG. 3 is an explanatory diagram illustrating exemplary information propagated by the OFCND packet with a packet type of NAD. FIG. 4 is an explanatory diagram illustrating exemplary information propagated by the OFCND packet with a packet type of NRS.

An OFCND message includes a Type field indicating a type and a Node field indicating a type of a node (Node). The Node field includes the fields OFC Domain ID, OFS Domain ID, OFS ID, OFS Port ID, and Port Link Cost.

In the example illustrated in FIG. 3, the Node field is set with ON (Original Node). In the OFCND message illustrated in FIG. 3, OFC domain ID, OFS Domain ID, OFS ID, OFS Port ID, and Port Link Cost are set with transmission domain ID, transmission OFS Domain ID, transmission OFS ID, transmission OFS port ID, and information on transmission port link cost, respectively.

In the example illustrated in FIG. 4, a Node field set with NN (Neighbor Node) is present in addition to the Node field set with ON. In the OFCND message illustrated in FIG. 4, NodeID of the Node field illustrated in FIG. 3 is set at NN.

In the Node field set with ON, OFC Domain ID, OFS Domain ID, OFS ID, OFS Port ID, and Port Link Cost are set with adjacent OFC domain ID receiving NAD, adjacent OFS domain ID receiving NAD, adjacent OFS ID receiving NAD, adjacent OFS port ID receiving NAD, and information on adjacent port link cost receiving NAD, respectively.

OFS Domain ID in the Node field is directed for identifying each group of OFSs when one OFC manages a plurality of groups of OFSs in an isolated island state. FIG. 5 is an explanatory diagram illustrating a state in which an OFC manages a plurality of groups of OFSs. The example illustrated in FIG. 5 indicates that one OFC1 manages two OFS domains. In this way, each OFC may manage a plurality of isolated (island state) groups of OFSs.

OFS Domain ID is assigned with a unique ID in the OFC domain and managed by the OFC.

OFC Domain ID is also assigned with a unique ID in the communication control system. Any method for assigning OFC Domain ID is possible. For example, OFC Domain ID may be manually set to each OFC, or may be automatically assigned among OFCs, or may be automatically assigned by other device having an intensive management function.

A frame of the OFCND packet is not particularly limited in format or the like when meeting the following conditions.

MACSA (MAC Source Address)
    MAC of NIC (Network Interface Card) used as OFC OpenFlow Channel
    Common virtual MAC for cluster configuration
MACDA (MAC Destination Address)
    BC/MC for packet type of NAD
    MACSA of reception NAD for packet type of NRS
MACDA with transmissive legacy switch
    Ether Type
Ether Type with transmissive legacy switch Each OFC transmits the OFCNAD packet to other OFC domains and the OFC receiving the OFCNAD answers OFCNRS to the OFC domain transmitting the OFCNAD thereby to specify adjacent OFC domain (Neighbor Discovery).

Specifically, the inter-domain topology management module 21 transmits the OFCNAD packet to other OFC domains. When receiving the OFCNAD, the inter-domain topology management module 21 answers OFCNRS to the OFC domain transmitting the OFCNAD.

When receiving a correct OFCNRS packet to the transmitted OFCNAD packet, the inter-domain topology management module 21 records the port transmitting the OFCNAD packet as neighbor external port (port where adjacent OFC domain is present).

An adjacent OFC domain specification processing (neighbor discovery processing) will be specifically described below. A domain managed by an OFC will be denoted as OFC-OFS domain below. The description of the present exemplary embodiment assumes one OFS domain managed by an OFC, but two or more OFS domains may be possible.

At first, the internal domain topology management module 22 detects a topology of the OFC-OFS domain and constructs a physical BCMC distribution tree and a logic BCMC distribution tree. A method for detecting a topology of a domain and a method for constructing a distribution tree are well known, and the description thereof will be omitted.

How the external ports are connected with external OFC domains is not clear in the initial state, and thus the information that connection of the external ports is not clear (0, for example) is set. Thus, the internal domain topology management module 22 sets a flow entry thereby to prohibit packets other than OFCND from being exchanged from the external ports set in the external port state of 0.

When a packet with a different type from OFCND is used for detecting a topology in the OFC domain, the internal domain topology management module 22 may enable the packet to be exchanged similarly to OFCND.

The internal domain topology management module 22 notifies the external port state to the inter-domain topology management module 21.

The inter-domain topology management module 21 registers a flow entry for packet-in of the OFCND packet meeting the following condition (OFCND packet-in flow) for the external port in the external port state of 0.

OFC performs Packet_In when receiving OFCND

The internal domain topology management module 22 transmits the OFCNAD packet to all the external ports by use of a Packet_Out message. The OFCNAD packet reaches a connective external OFC domain, and thus matches with the OFCND packet-in flow to be subjected to Packet_In by the OFC.

The inter-domain topology management module 21 compares MACSA in the received OFCNAD, OFC Domain ID and OFS Domain ID in the ON Node with the MAC, the OFC domain ID, and OFS Domain ID receiving OFCNAD.

When all the items match with each other, the inter-domain topology management module 21 instantly blocks packet forwarding from the port identified by OFS Port ID in the ON Node or the OFS Port receiving OFCNAD. A port to be blocked may be determined depending on the mounted OFC.

When receiving the OFCNAD packet, the inter-domain topology management module 21 transmits the OFCNRS packet to the OFCNAD packet reception port. The OFCNRS packet reaches the OFC domain transmitting the OFCNAD, and thus matches with the OFCNAD packet-in flow to be subjected to Packet_In by the OFC.

The inter-domain topology management module 21 compares the OFC domain ID, the OFS domain ID receiving OFCNRS, OFS ID, and PORT ID with the ON Node information in OFCNRS. When all the items do not match with each other, the received packet is discarded.

On the other hand, when all the items match with each other, the inter-domain topology management module 21 holds a neighbor domain DB in the inter-domain topology information storage unit 13 as the information that the OFC-OFS domain under its control is connected with adjacent OFC-OFS domain from the ON Node Information and the NN Node information of the received OFCNRS.

Further, the inter-domain topology management module 21 determines the port connected with the external OFC-OFS domain as an external port where adjacent domain is present, and sets the external port state at 2. That is, the external port in the external port state of 2 indicates that neighbor discovery is completed and adjacent domain is present.

When a preset certain time elapses and timeout occurs, the inter-domain topology management module 21 sets the external port in the external port state of 0 to be in the external port state of 1. That is, the external port in the external port state of 1 indicates that neighbor discovery is completed and adjacent domain is not present.

Thereafter, the inter-domain topology management module 21 recognizes the external port in the external port state of 1 as an external port where adjacent domain is not present. The inter-domain topology management module 21 performs typical series of processing performed by the OFC for external ports (such as processing of enabling packet-in and processing performed as element of BCMC tree in the OFC) on the external port.

The OFC transmits and receives OFCND at all the external ports thereby to keep the neighbor domain DB. For example, when correctly receiving new OFCNRS for OFC-NAD, the inter-domain topology management module 21 updates the neighbor domain DB by the new information.

On the other hand, when not being able to correctly receive OFCNRS for OFCNAD, the inter-domain topology management module 21 performs a certain retry processing thereby to perform an operation of deleting relevant information from the neighbor domain DB.

The processing of exchanging packets other than OFCND via an external port where adjacent domain is present is still prohibited in the above series of processing.

(2) Loop Discovery Stage

The inter-domain topology management module 21 determines whether a loop is present in the communication paths. In the following description, a loop in communication paths will be denoted as closed graph. According to the present exemplary embodiment, when determining whether a loop is present, the inter-domain topology management module 21 uses an OFCDU (OFC Data Unit) packet.

OFCDU has a similar format to a BPDU (Bridge Protocol Data Unit) packet used for STP (Spanning Tree Protocol). The BPDU packet is used for transmitting switch information, while the OFCDU packet used in the present exemplary embodiment is used for transmitting the following information (specifically, OFC-OFS domain information).

Root OFC-OFS Domain ID
    Transmission OFC-OFS Domain ID
    Root Path Cost (path cost with root OFC-OFS domain for each OFC-OFS domain)

The inter-domain topology management module 21 performs the series of processing on the OFCDU by use of a similar algorithm to STP. A loop avoiding processing will be described below.

The inter-domain topology management module 21 registers a flow entry (OFCDU packet-in flow) for performing packet-in on the OFCDU packet meeting the following condition for all the external ports where adjacent domain is present.

OFC performs Packet_In when receiving OFCDU packet.

The inter-domain topology management module 21 exchanges OFCDU at all the external ports where adjacent domain is present. The OFCs exchange OFCDU so that the OFCs determine Root OFC-OFS Domain.

Specifically, the inter-domain topology management module 21 initially recognizes that all of its managing OFC-OFS Domains are Root OFC-OFS Domains, and sets OFC-OFS Domain ID at Root OFC-OFS Domain ID of OFCDU. The inter-domain topology management module 21 then transmits OFCDU to each external port where adjacent domain is present.

Each controller compares Root OFC-OFS Domain ID of the received OFCDU with its managing OFC-OFS Domain ID. When Root OFC-OFS Domain ID of the received OFCDU is smaller than its managing OFC-OFS Domain ID, the inter-domain topology management module 21 determines that it is not Root OFC-OFS Domain.

The series of processing is repeatedly performed so that the only Root OFC-OFS Domain is specified on each closed graph. Thereafter, only OFC specified as Root OFC-OFS Domain transmits OFCDU. Other OFCs receive OFCDU and add Path Cost thereto to be forwarded.

An external port where adjacent domain is present in Root OFC-OFS Domain is a representative port. Further, the closest (Root Path Cost) port to Root OFC-OFS Domain is Root Port in other OFC-OFS Domains.

For the adjacent ports present in other different OFC-OFS Domains, a port of the OFC-OFS Domain close to Root OFC-OFS Domain is representative port, and a distant port is a non-representative port.

The inter-domain topology management module 21 performs typical series of processing (such as processing of enabling packet-in and processing performed as element of the BCMC tree in OFC) performed by the OFC on the representative port where adjacent domain is present. The series of processing is performed so that a communication tree for avoiding the loop configuration constructed in STP (single path) is constructed. The communication tree may be denoted as Inter-Domain BCMC Tree below.

In the above series of processing, in the case of the same Root Path Cost, the inter-domain topology management module 21 may sequentially compare transmission OFC-OFS Domain ID, reception OFS ID, and reception OFS Port ID in OFCDU.

The inter-domain topology management module 21 keeps the Inter-Domain BCMC Tree by use of a similar method to the method used for STP. The inter-domain topology management module 21 in Root OFC-OFS Domain may continuously transmit OFCDU at certain intervals, for example. Further, when not being able to receive OFCDU within a certain time, the inter-domain topology management module 21 may transmit OFCDU and perform the loop discovery processing again.

In this way, when a closed graph where the communication paths are looped between the OFC domains is present, the inter-domain topology management module 21 calculates a communication tree for avoiding the loop configuration used for STP for the closed graph. Consequently, communication is enabled between the OFC-OFS domains via the Inter-Domain BCMC Tree as a constructed communication tree.

(3) Topology Discovery Stage

The inter-domain topology management module 21 specifies a network topology between OFC domains. According to the present exemplary embodiment, when determining an inter-domain network topology, the inter-domain topology management module 21 uses an OFCTDDU (OFC Topology Discovery Data Unit) packet.

FIG. 6 is an explanatory diagram illustrating an exemplary OFCTDDU packet. In the OFCTDDU packet illustrated in FIG. 6, each Node ID includes the fields OFC Domain ID, OFS Domain ID, OFS ID, OFS Port ID, and Port Link Cost.

A frame of the OFCTDDU packet is not particularly limited in format or the like when meeting the following conditions.

MACSA
   MAC of NIC used as OFC OpenFlow Channel
   Common virtual MAC for cluster configuration
MACDA
   BC/MC
   MACDA with transmissive legacy switch
Ether Type
   Ether Type with transmissive legacy switch Node information is stored in each Node label in OFCTDDU. Information on OFC-OFS domain transmitting OFCTDDU is stored in the Node label with Node ID=0. When the OFC receives OFCTDDU, the inter-domain topology management module 21 increments Node ID at the tail of OFCTDDU thereby to create a new Node label, and stores the information on the reception OFC-OFS domain in the Node label.

Specifically, the inter-domain topology management module 21 in each OFC transmits OFCTDDU storing transmission source OFC-OFS Domain information therein to all the external ports where adjacent domain is present. When the OFC receives OFCTDDU, the inter-domain topology management module 21 determines whether the information on OFC-OFS Domain receiving OFCTDDU is included in the OFCTDDU.

When the information is included in the OFCTDDU, the inter-domain topology management module 21 learns topology information. On the other hand, when the information is not included in the OFCTDDU, the inter-domain topology management module 21 learns topology information, further adds the OFC-OFS Domain information to the OFCTDDU, and forwards it to the external ports where adjacent domain is present other than the reception port.

After a certain time elapses, the topology management module 20 in the OFC specifies a topology of the entire network (which may be denoted as Inter-Domain Topology) based on the collected topology information and notifies it to the path calculation module 10.

When specifying Inter-Domain Topology, the inter-domain topology management module 21 may use the largest value among link cost of the adjacent ports as link cost (edge cost) in the topology.

(4) Unicast Path Calculation Stage

The path calculation module 10 calculates a path based on the communication paths by use of the specified network topology, and controls communication from a device connected to each OFS. Specifically, the path calculation module 10 rewrites broadcast MACDA of ARP (Address Resolution Protocol) Request, and sets transmission source OFC-OFS Domain ID information of MACSA. The path calculation module 10 then notifies the rewritten packet to other OFCs via the Inter-Domain BCMC Tree.

The transmission source OFC-OFS Domain ID information of MACSA is transmitted in an OFSDA packet and an OFSDD packet. FIG. 7 is an explanatory diagram illustrating the OFSDA packet and the OFSDD packet by way of example. In the OFSDA packet illustrated in FIG. 7, "03255c00" is set as a fixed value for identifying the OFSDA. Further, in the OFSDD packet illustrated in FIG. 7, "03255c01" is set as a fixed value for identifying the OFSDD.

The OFSDA packet and the OFSDD packet illustrated in FIG. 7 are exemplary. However, they meet the following conditions.

MACDA
   Multicast
   Having a field for storing an identifier for discriminating OFCDA from OFCDD
   Having a field for storing transmission source OFC-OFS Domain ID information of MACSA
Ether Type
   ARP At first, the path calculation module 10 registers the following OFCDA-OFCDD packet-in flow for external ports where adjacent domain is present on the Inter-Domain BCMC Tree.

OFC performs Packet_In when receiving OFCDA or OFCDD.

The path calculation module 10 then floods BC ARP Request received from a terminal (such as PC) to the external ports where adjacent domain is not present in each OFS in each OFS domain via the BCMC tree in the OFC domain.

The path calculation module 10 learns MACSA of BC ARP Request and registers it in the MAC local table storage unit 12. A path in the OFS domain is specified in an existing method.

The path calculation module 10 then rewrites BC ARP Request received from a terminal (such as PC) to OFSDA, and floods it to the external ports where adjacent domain is present on the Inter-Domain BCMC Tree.

When the OFC receives OFCDA, the path calculation module 10 registers MACSA included in OFSDA as well as OFC domain ID and OFS domain ID set for MACDA in the MAC/destination domain table storage unit 11.

The path calculation module 10 then floods the OFCDA packet to all the external ports where adjacent domain is present (except the reception port) on the Inter-Domain BCMC Tree.

The path calculation module 10 then floods, to the external ports where adjacent domain is not present in the domain, ARP Request in which MACDA of OFCDA is written back to broadcast MACDA via the BCMC tree in the received OFC domain.

With the above series of processing, each OFC can grasp OFC-OFS Domain ID where terminal MAC is present.

There will be described below the series of processing when the OFC receives a packet in which terminal MAC is set at MACDA.

When terminal MAC is present in the MAC local table storage unit 12, the path calculation module 10 controls the packets to be forwarded to a port where the terminal MAC is present in a typical method. The path calculation module 10 may add a flow entry thereby to control packets to be forwarded, for example.

On the other hand, when the terminal MAC is not present in the MAC local table storage unit 12, the path calculation module 10 searches in the MAC/destination domain table storage unit 11.

When the terminal MAC is not present in the MAC/destination domain table storage unit 11, the path calculation module 10 recognizes the received packet as Unknown unicast packet. The path calculation module 10 then floods the received packet to all the external ports where adjacent domain is present on the Inter-Domain BCMC Tree and the external ports where adjacent domain is not present in the OFC-OFS domain.

On the other hand, when the terminal MAC is present in the MAC/destination domain table storage unit 11, the path calculation module 10 searches the shortest path with the OFC-OFS domain receiving the Unicast packet as the start point and the destination OFC-OFS domain in the MAC/destination domain table as the end point.

The path calculation module 10 may search the shortest path by use of any typically-used search algorithm such as Dijkstra's algorithm.

Further, when a plurality of shortest paths are present, the path calculation module 10 may select a path by use of preset distribution algorithm (such as round robin, MAC hash, or IP hash).

The path calculation module 10 controls the packet to be forwarded to the port connected to the OFC-OFS domain on the calculated shortest path. The path calculation module 10 sets a flow entry for OFS, and causes it to perform hardware transfer of Unicast packets to be forwarded, for example.

When the MAC under control of OFC management disappears, the path calculation module 10 deletes the learning information of the disappeared MAC from the MAC local table storage unit 12. The path calculation module 10 then floods OFCDD in which the MAC is set for MACSA to each OFC-OFS domain via the Inter-Domain BCMC Tree. When the OFC receives OFCDD, the path calculation module 10 deletes the information on MACSA set for OFCDD from the MAC/destination domain table storage unit 11.

After topology discovery is completed, the path calculation module 10 calculates a Unicast path thereby to perform Known Unicast forwarding and load distribution. Therefore, even when a physical loop is present among a plurality of connected OFC domains, communication can be made via an optimum path without looping the communication.

The exemplary operations of the communication control system according to the first exemplary embodiment will be further described below with reference to FIG. 1. In the example illustrated in FIG. 1, each OFC constructs a BCMC Tree in its domain in an existing system. Specifically, it is assumed that a link between OFS3 and OFS4 is blocked in the OFC1 domain 110 (which will be denoted as OFC1-OFS1 domain below), a link between OFS2 and OFS4 is blocked in the OFC2 domain 120 (which will be denoted as OFC2-OFS1 domain below), and a link between OFS3 and OFS4 is blocked in the OFC3 domain 130 (which will be denoted as OFC3-OFS1 domain below).

Further, OFS1-Port1, OFS2-Port1, OFS3-Port1, and OFS4-Port1 in OFC1-OFS1 domain are recognized as external ports by OFC1.

Similarly, OFS1-Port1 and OFS3-Port1 in OFC2-OFS1 domain are recognized as external ports by OFC2. Further, OFS1-Port1 and OFS2-Port1 in OFC3-OFS1 domain are recognized as external ports by OFC3.

(1) Neighbor Discovery Stage

The internal domain topology management module 22 in each OFC floods OFCNAD to the external ports present under its control. OFCNAD transmitted by OFC1 includes the following information.

For OFS1-Port1
   Type: NAD,
   Original Node: {OFC1 domain, OFS1 domain, OFS1, port1, LinkCost1}
For OFS2-Port1
   Type: NAD,
   Original Node: {OFC1 domain, OFS1 domain, OFS2, Port1, LinkCost1}
For OFS3-Port1
   Type: NAD.
   Original Node: {OFC1 domain, OFS1 domain, OFS3, Port1, LinkCost1}
For OFS4-Port1
   Type: NAD,
   Original Node: {OFC1 domain, OFS1 domain, OFS4, Port1, LinkCost2}

OFCND (NAD) transmitted from OFC1 reaches the PC211, the PC212, OFC2-OFS1 domain, and OFC3-OFS1 domain. The PC 211 and the PC 212 are terminals, and do not respond to the ONCND (NAD) packet.

OFCND (NAD) reaching OFC2-OFS1 domain and OFC3-OFS1 domain matches with the OFCND packet-in flow, and is subjected to Packet_In by OFC2 and OFC3, respectively.

The inter-domain topology management module 21 in OFC2 and OFS3 answers OFCND (NRS). In this case, the OFCND (NRS) packet transmitted by OFC2 and OFC3 includes the following information.

OFC2 for OFS1-Port1
   Type: NRS,
   Original Node: {OFC1 domain, OFS1 domain, OFS2, Port1, LinkCost1},
   Neighbor Node: {OFC2 domain, OFS1 domain, OFS1, Port1, LinkCost1}
OFC3 for OFS1-Port1
   Type: NRS,
   Original Node: {OFC1 domain, OFS1 domain, OFS4, Port1, LinkCost2},
   Neighbor Node: {OFC3 domain, OFS1 domain, OFS1, Port1, LinkCost1}

OFCND (NRS) transmitted from OFC2 and OFC3 reaches OFC1-OFS1 domain, matches with the OFCND packet flow, and is subjected to Packet_In by OFC1. The inter-domain topology management module 21 in OFC1 recognizes OFS2-Port1 and OFS4-Port1 as neighbor external ports, and records the following information in the inter-domain topology information storage unit 13.

Original Node: {OFC1 domain, OFS1 domain, OFS2, Port1, LinkCost1},
   Neighbor Node: {OFC2 domain, OFS1 domain, OFS1, Port1, LinkCost1}
   Original Node: {OFC1 domain, OFS1 domain, OFS4, Port1, LinkCost2},
   Neighbor Node: {OFC3 domain, OFS1 domain, OFS1, Port1, LinkCost1}

On the other hand, OFCND (NRS) is not received at OFS1-Port1 and OFS3-Port1. Therefore, the inter-domain topology management module 21 in OFC1 recognizes the two ports as neighbor-less external ports, and enables Packet-In or packet forwarding of OFS1-Port1 and OFS3-Port1 according to an existing system.

In this case, communication in OFC1 domain (communication between the PC 211 and the PC 212, for example)

is enabled. Other OFC2 and OFC3 similarly perform the neighbor discovery processing. The information detected by OFC2 has the following contents.

Original Node: {OFC2 domain, OFS1 domain, OFS1, Port1, LinkCost1},
        Neighbor Node: {OFC1 domain, OFS1 domain, OFS2, Port1, LinkCost1}
    Original Node: {OFC2 domain, OFS1 domain, OFS3, Port1, LinkCost1},
        Neighbor Node: {OFC3 domain, OFS1 domain, OFS2, Port1, LinkCost1}

Similarly, the information detected by OFC3 has the following contents.

Original Node: {OFC3 domain, OFS1 domain, OFS1, Port1, LinkCost1},
        Neighbor Node: {OFC1 domain, OFS1 domain, OFS4, Port1, LinkCost2}
    Original Node: {OFC3 domain, OFS1 domain, OFS2, Port1, LinkCost1},
        Neighbor Node: {OFC2 domain, OFS1 domain, OFS3, Port1, LinkCost1}

(2) Loop Discovery Stage

Each OFC transmits and receives OFCDU thereby to perform an operation similar to STP described in the above exemplary embodiment, thereby preventing a loop among OFC domains. Algorithm for preventing a loop is similar to the STP-based processing, and thus the detailed description thereof will be omitted.

Herein, OFC1-OFS1 domain with the minimum OFC domain ID is selected as Root Domain. On the other hand, OFS2-Port1 of the OFC3-OFS1 domain is selected as non-representative port.

The inter-domain topology management module 21 in each OFC enables Packet_In or packet forwarding for the neighbor external ports other than OFS2-Port1 of the OFC3-OFS1 domain. Consequently, the following Inter-Domain BCMC Tree is configured. Subsequently, communication between OFC-OFS domains is made via the Inter-Domain BCMC Tree.

(OFC1-OFS1 domain, OFS2, Port1) and (OFC2-OFS1 domain, OFS1, Port1) are connected.
    (OFC1-OFS1 domain, OFS4, Port1) and (OFC3-OFS1 domain, OFS1, Port1) are connected.

(3) Topology Discovery Stage

Each OFC transmits OFCTDDU to all the neighbor external ports. The exemplary series of processing on OFCTDDU transmitted from OFC1 will be described herein.

The inter-domain topology management module 21 in OFC1 transmits OFCTDDU including the following information to OFS2-Port1 and OFS4-Port1, respectively. At this time, Linkcost stored in the Node label with Node ID=0 is a link cost value of the link set for the ports (OFS2-Port1 and OFS4-Port1) where OFCTDDU is transmitted.

For OFS2-Port1
        Node ID=0
        {OFC1 domain, OFS1 domain, Linkcost1}
    For OFS4-Port1
        Node ID=0
        {OFC1 domain, OFS1 domain, Linkcost2}

OFCTDDU reaching OFC2-OFS1 domain matches with the OFCTDDU packet-in flow and is subjected to Packet_In by OFC2. The inter-domain topology management module 21 in OFC2 learns the topology information included in OFCTDDU.

The inter-domain topology management module 21 in OFC2 determines that the information on OFC-OFS domain (OFC2-OFS1 domain) receiving OFCTDDU is not included in the Node label of OFCTDDU. Thus, the inter-domain topology management module 21 increments the last Node ID in the received OFCTDDU, and stores the information on OFC2-OFS1 domain receiving OFCTDDU in the Node label with the new Node ID.

The inter-domain topology management module 21 in OFC2 floods newly-created OFCTDDU to the neighbor external port (OFS3-Port1 present in OFC2-OFS1 domain) other than the reception port.

OFCTDDU originated by OFC1 is forwarded via OFC2, and includes the following information.

For OFS3-Port1
        Node ID=0
        {OFC1 domain, OFS1 domain, Linkcost1}
        Node ID=1
        {OFC2 domain, OFS1 domain, Linkcost1}

Similarly, the inter-domain topology management module 21 in OFC3 learns the topology information from the received OFCTDDU packet. The inter-domain topology management module 21 in OFC3 creates new OFCTDDU based on the received OFCTDDU, and floods it to OFS2-Port1.

OFCTDDU originated by OFC1 is forwarded via OFC3, and has the following information.

For OFS2-Port1
        Node ID=0
        {OFC1 domain, OFS1 domain, Linkcost2}
        Node ID=1
        {OFC3 domain, OFS1 domain, Linkcost1}

On the other hand, OFCTDDU originated by OFC1 is forwarded from OFC2 and reaches OFC3. The inter-domain topology management module 21 in OFC3 leans the topology information from the received OFCTDDU packet.

The inter-domain topology management module 21 in OFC3 determines that the information on the reception OFC-OFS domain receiving OFCTDDU is not included in the Node label of OFCTDDU. Thus, the inter-domain topology management module 21 creates new OFCTDDU, and floods it to OFS1-Port1.

The following information is included in the newly-created OFCTDDU.

For OFS1-Port1
        Node ID=0
        {OFC1 domain, OFS1 domain, Linkcost1}
        Node ID=1
        {OFC2 domain, OFS1 domain, Linkcost1}
        Node ID=2
        {OFC3 domain, OFS1 domain, Linkcost1}

Further, OFCTDDU originated from OFC1 is forwarded from OFC3 and reaches OFC2. The inter-domain topology management module 21 in OFC2 leans the topology information from the received OFCTDDU packet.

The inter-domain topology management module 21 in OFC2 determines that the information on the reception OFC-OFS domain receiving OFCTDDU is not included in the Node label of OFCTDDU. Thus, the inter-domain topology management module 21 creates new OFCTDDU, and floods it to OFS1-Port1.

The following information is included in the newly-created OFCTDDU.

For OFS1-Port1
        Node ID=0
        {OFC1 domain, OFS1 domain, Linkcost2}
        Node ID=1
        {OFC2 domain, OFS1 domain, Linkcost1}
        Node ID=2
        {OFC3 domain, OFS1 domain, Linkcost1}

Thereafter, OFC1 receives OFCTDDU routed from OFC1 via OFC2 and OFC3, and OFCTDDU routed from OFC1 via OFC3 and OFC2. The inter-domain topology management module 21 in OFC1 determines that its OFC-OFS domain (OFC1-OFS1 domain) is included in the Node label of OFCTDDU. Thus, the inter-domain topology management module 21 leans the topology information included in OFCTDDU, and discards the OFCTDDU packet.

Similarly, OFC2 and OFC3 also issue their OFCTDDU, and perform the topology discovery processing. Consequently, OFC1, OFC2, and OFC3 hold the following topology information.

OFC1-OFS1 domain and OFC2-OFS1 domain are connected at Linkcost1.

OFC1-OFS1 domain and OFC3-OFS1 domain are connected at Linkcost2.

OFC2-OFS1 domain and OFC3-OFS1 domain are connected at Linkcost1.

(4) Unicast Path Calculation Stage

In the present specific example, the PC 211 transmits ARP Request. ARP Request reaches OFC1-OFS1 domain, and is subjected to Packet_In by OFC1.

The path calculation module 10 in OFC1 floods ARP Request to OFS3-Port1, and registers MACSA and leaning position (OFS1-Port1 of OFS1 domain) of ARP Request in the MAC local table.

The path calculation module 10 in OFC1 rewrites ARP Request to OFCDA. Specifically, the path calculation module 10 contains ID of OFC1-OFS1 domain receiving ARP Request in OFCDA, and floods the OFCDA to the neighbor external ports on the Inter-Domain BCMC Tree.

OFC2 and OFC3 receive OFCDA including MAC of the PC 211 issued from OFC1 as MACSA at Packet_In.

The path calculation module 10 in OFC2 extracts MACSA of the PC 211 and ID of OFC1-OFS1 domain as transmission source domain of the MAC from the received OFCDA, and registers them in the MAC/destination domain table storage unit 11.

Similarly, the path calculation module 10 in OFC3 extracts MACSA of the PC 211 and ID of OFC1-OFS1 domain as transmission source domain of the MAC, and registers them in the MAC/destination domain table storage unit 11. Further, the path calculation module 10 in OFC3 rewrites OFCDA to ARP Request, and floods it to OFS4-Port1 and OFS3-Port1.

All of the PC 211, the PC 212, the PC 231, and the PC 232 issue ARP Request, the following information is registered in the MAC local table storage unit 12 and the MAC/destination domain table storage unit 11 in OFC1, OFC2, and OFC3.

<OFC1>

MAC local table

MACSA=PC211, Learning Point: OFS1-Port1

MACDA=PC212, Learning Point: OFS2-Port1

MAC/destination domain table

MACSA=PC231, Learning Point: OFC3-OFS1 domain

MACSA=PC 232, Learning Point: OFC3-OFS1 domain

<OFC2>

MAC local table

Empty (not set)

MAC/destination domain table

MACSA=PC211, Learning Point: OFC1-OFS1 domain

MACSA=PC212, Learning Point: OFC1-OFS1 domain

MACSA=PC231, Learning Point: OFC3-OFS1 domain

MACSA=PC232, Learning Point: OFC3-OFS1 domain

<OFC3>

MAC local table

MACSA=PC231, Learning Point: OFS4-Port1

MACDA=PC232, Learning Point: OFS3-Port1

MAC/destination domain table

MACSA=PC211, Learning Point: OFC1-OFS1 domain

MACSA=PC212, Learning Point: OFC1-OFS1 domain

For example, when Unicast communication is made from the PC 211 to the PC 231, the path calculation module 10 in OFC1 searches in the MAC local table storage unit 12 by MACDA (the PC 231) of the Unicast packet received at Packet_In.

In this case, MACDA of interest is not present in the MAC local table storage unit 12, and thus the path calculation module 10 in OFC1 searches in the MAC/destination domain table storage unit 11 by the PC 231. Consequently, the path calculation module 10 in OFC1 knows that the PC 231 is present in OFC3-OFS1 domain.

The path calculation module 10 in OFC1 searches the lowest-cost path on the topology with OFC-OFS domain (OFC1-OFS1 domain) receiving the Unicast packet as the start point and OFC3-OFS1 domain where the PC 231 is present as the end point.

In this example, the path calculation module 10 in OFC1 calculates the lowest-cost path described below.

(1) Linkcost=2 from OFC1-OFS1 domain via OFC2-OFS1 domain to OFC3-OFS1 domain (2) Linkcost=2 from OFC1-OFS1 domain to OFC3-OFS1 domain As described above, two lowest-cost paths are present. Thus, the path calculation module 10 in OFC1 selects any path according to a typical OFC load distribution algorithm. Herein, the path (1) is assumed to be selected.

The path calculation module 10 in OFC1 obtains OFS ID and Port ID for forwarding to OFC2-OFS1 domain with reference to the inter-domain topology information storage unit 13. The path calculation module 10 in OFC1 then controls the Unicast packet from the PC 211 to the PC 231 to be forwarded to OFC2-OFS1 domain.

The Unicast packet from the PC 211 to the PC 231 is forwarded from OFC1-OFS1 domain to OFC2-OFS1 domain.

OFC2 receives the Unicast Packet at Packet_In. The path calculation module 10 in OFC2 searches MACDA (the PC 231) from the MAC local table storage unit 12 and the MAC/destination domain table storage unit 11. In this example, the path calculation module 10 in OFC2 knows that the PC 231 is present in OFC3-OFS1 domain.

The path calculation module 10 in OFC2 searches the lowest-cost path on the topology with OFC-OFS domain (OFC2-OFS1 domain) receiving the Unicast packet-in as the start point and OFC3-OFS1 domain where the PC 231 is present as the end point.

In this example, the path calculation module 10 in OFC2 calculates the lowest-cost path described below.

(1) Linkcost=1 from OFC2-OFS1 domain to OFC3-OFS1 domain

The path calculation module 10 in OFC2 obtains OFS ID and Port ID for forwarding to OFC3-OFS1 domain with reference to the inter-domain topology information storage unit 13. The path calculation module 10 in OFC2 then controls the Unicast packet from the PC 211 to the PC 231 to be forwarded to OFC3-OFS1 domain.

The Unicast packet from the PC 211 to the PC 231 reaches OFC3 at Packet_In.

The path calculation module 10 in OFC3 searches MACDA (the PC 231) from the MAC local table storage unit 12. The path calculation module 10 then knows that the PC 231 is connected to OFS4-Port1 under its control. Thus, the path calculation module 10 in OFC3 controls the Unicast packet from the PC 211 to the PC 231 to be forwarded to OFS4-Port1.

With the above series of processing, the Unicast packet is forwarded from the PC 211 via OFC1-OFS1 domain, OFC2-OFS1 domain, and OFC3-OFS1 domain up to the PC 231.

The above description is made on the case where the Unicast packet is solely transmitted from the PC 211 to the PC 231. For example, communication from the PC 211 to the PC 231 and communication from the PC 212 to the PC 232 may be made at the same time. In this case, the path calculation module 10 in each OFC may perform the series of processing in consideration of traffic load distribution.

When communication from the PC 211 to the PC 231 and communication from the PC 212 to the PC 232 are made at the same time, two lowest-cost paths from OFC1-OFS1 domain to OFC3-OFS1 domain are present. The path calculation module 10 may perform the load distribution processing by use of the round robin algorithm, for example. In this case, the path calculation module 10 may calculate a path from OFC1-OFS1 domain via OFC2-OFS1 domain to OFC3-OFS1 domain for the communication from the PC 211 to the PC 231. Further, the path calculation module 10 may calculate a path from OFC1-OFS1 domain to OFC3-OFS1 domain for the communication from the PC 221 to the PC 232.

As described above, according to the present exemplary embodiment, the inter-domain topology management module 21 specifies OFC domain adjacent to its OFC domain. The inter-domain topology management module 21 creates a communication tree for avoiding a loop configuration present in the communication paths with the adjacent OFC domain and specifies a network topology between the OFC domains. The path calculation module 10 then calculates an optimum path based on the communication tree and controls communication from a communication device connected to each OFS by use of the specified network topology.

Thus, even when a physical loop is present among a plurality of connected OFC domains under the OpenFlow network environment, communication can be made by use of an optimum path without looping the communication.

Specifically, the communication control system according to the present exemplary embodiment can be realized by use of a standard OpenFlow protocol without influencing the existing OFC processing systems. Then, the use of the communication control system according to the present exemplary embodiment enables a loop among the OpenFlow networks controlled by a plurality of independently-operating OFCs to be prevented, thereby employing a redundant structure among the OpenFlow networks.

Further, according to the present exemplary embodiment, even when a plurality of candidate communication paths are present among the OpenFlow networks controlled by a plurality of independently-operating OFCs, ECMP (Equal-cost multi-path) load balancing can be realized. Thus, an efficiency of network band use can be enhanced.

Further, according to the present exemplary embodiment, even when a dark fiber is present among OpenFlow networks, a path can be calculated by use of optimum link cost, thereby enhancing an efficiency of network band use. Therefore, a possibility of limited band, which occurs due to erroneous determination as to dark fiber link cost, can be reduced.

Second Exemplary Embodiment

A second exemplary embodiment of the present invention will be described below. According to the first exemplary embodiment, OFC calculates a domain topology of the entire system based on adjacent domain information, and further calculates inter-domain SPT. On the other hand, according to the present exemplary embodiment, all the OFCs in the entire system and a topology manager having an IP reach property are prepared so that the series of processing is performed by the topology manager thereby to notify the processing result to each OFC.

In this way, according to the first exemplary embodiment, each OFC autonomously controls communication, and thus the method described according to the first exemplary embodiment can be called completely-autonomous method. Further, with the method described according to the present exemplary embodiment, communication is controlled in cooperation between OFC and the topology manager, and thus the method can be called hybrid method.

Figure 8:
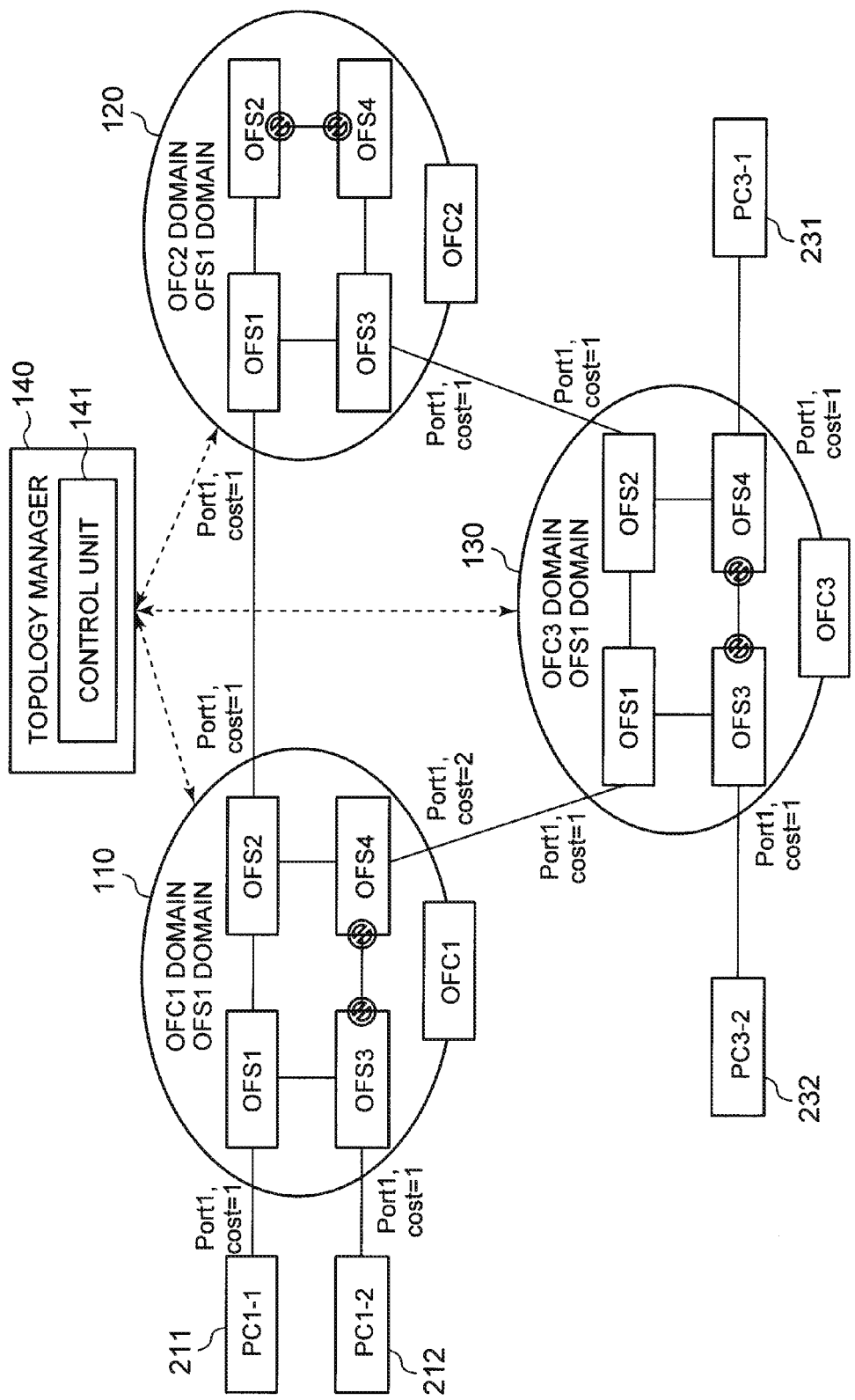
FIG. 8 It depicts an explanatory diagram illustrating an exemplary structure of the communication control system according to a second exemplary embodiment of the present invention.

FIG. 8 is an explanatory diagram illustrating an exemplary structure of the communication control system according to the second exemplary embodiment of the present invention. The same component as in the first exemplary embodiment are denoted with the same reference numerals as in FIG. 1, and the description thereof will be omitted.

The communication control system illustrated in FIG. 8 includes a topology manager 140 in addition to the communication control system according to the first exemplary embodiment. Further, the topology manager 140 includes a control unit 141. The control unit 141 is realized by the CPU in a computer operating according to a program (inter-domain topology management program). For example, the program is stored in a storage unit (not illustrated) in the topology manager 140, and the CPU reads the program and may operate as the control unit 141 according to the program.

In OFC according to the present exemplary embodiment, when the series of processing in the neighbor discovery stage are completed, the inter-domain topology management module 21 in each OFC transmits the information on adjacent domain to the topology manager 140.

When the topology manager 140 receives the information on adjacent domain from each OFC, the control unit 141 calculates a topology between the OFC domains based on the received information, and further calculates a communication tree (such as spanning tree) for avoiding a loop configuration among the OFC domains. The control unit 141 then distributes the calculated communication tree to each OFC.

The control unit 141 may calculate a topology between OFC domains by use of the same method as performed by the inter-domain topology management module 21 according to the first exemplary embodiment, and may calculate a communication tree for avoiding a loop configuration between OFC domains.

The inter-domain topology management module 21 determines that the communication tree received from the topology manager 140 is an inter-domain communication path, and constructs an inter-domain spanning tree, for example. Subsequently, the path calculation module 10 performs the series of processing in the Unicast path calculation stage. The method for calculating a Unicast Path by the path calculation module 10 is similar as in the first exemplary embodiment.

In this way, in the hybrid system, the series of processing in the loop discovery stage in the completely-autonomous system and the series of processing in the topology discovery stage are performed by the topology manager 140, not by the OFC.

As described above, according to the present exemplary embodiment, instead of OFC, the control unit 141 in the topology manager 140 specifies a topology between the OFC domains based on the information on adjacent domains received from OFC, and creates a communication tree for avoiding a loop configuration present in communication paths between the adjacent OFC domains. The control unit 141 then distributes the created communication tree to each OFC.

Also with the structure, even when a physical loop is present among a plurality of connected OFC domains under the OpenFlow network environment, communication can be made by use of an optimum path without looping the communication.

In this way, a system realizing the present invention may employ the completely-autonomous system and the hybrid system, and can flexibly cope with different environments. In the completely-autonomous system, loop prevention or load distribution can be realized not via other device, for example. On the other hand, in the hybrid system, the topology manager for intensively managing a topology between OFC domains is used thereby to reduce network bands or loads occupied by OFCDU or OFCTDDU, for example.

Figure 9:
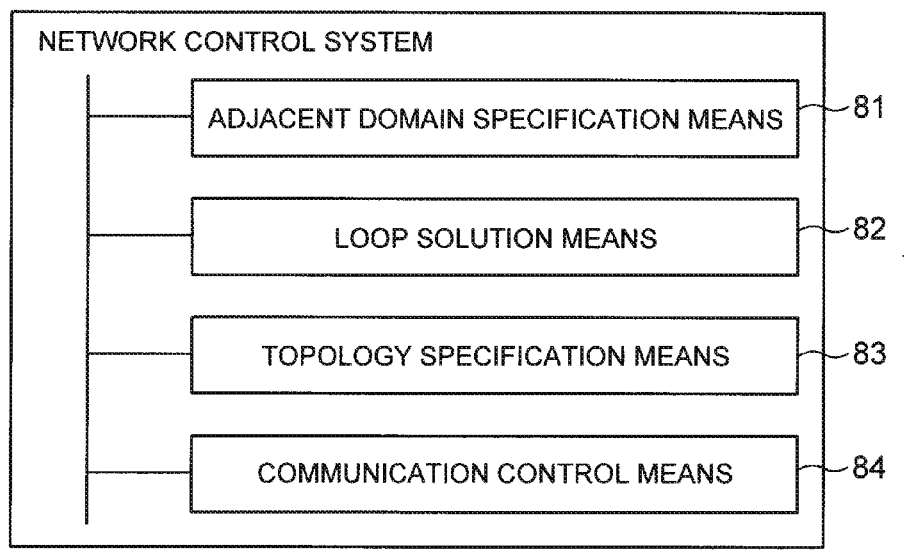
FIG. 9 It depicts a block diagram illustrating an outline of a communication control system according to the present invention.

An outline of the present invention will be described below. FIG. 9 is a block diagram illustrating an outline of a communication control system according to the present invention. The communication control system according to the present invention is directed for controlling communication among controller domains in a network in which the controller domains (such as OFC domains), each of which indicates a range where at least one or more OpenFlow switch (such as OFS1 to OFS4) is managed by each Open-Flow controller (such as OFC1 to OFC3), are mutually connected, and includes an adjacent domain specification means 81 (the inter-domain topology management module 21, for example) which specifies an adjacent controller domain to an own controller domain, a loop solution means 82 (the inter-domain topology management module 21, for example) which creates a communication tree (such as spanning tree) for avoiding a loop configuration present in communication paths with the adjacent controller domain, a topology specification means 83 (the inter-domain management module 21, for example) which specifies a network topology between controller domains, and a communication control means 84 (the path calculation module 10, for example) which calculates an optimum path based on the communication tree by use of the network topology and controls communication from a communication device (the PC 211, for example) connected to each OpenFlow switch.

With the above structure, even when a physical loop is present among a plurality of connected OFC domains under the OpenFlow network environment, communication can be made by use of an optimum path without looping the communication.

Further, the adjacent domain specification means 81 may transmit an adjacent confirmation packet (such as OFC-NAD) for confirming an adjacent domain from external ports of the own controller domain, return an adjacent response packet (such as OFCNRS) destined for the controller domain transmitting the adjacent confirmation packet when receiving the adjacent confirmation packet, and specify an adjacent controller domain receiving the adjacent response domain.

Further, the loop solution means 82 may create a communication tree for avoiding a loop configuration present in communication paths among adjacent controller domains based on a spanning tree algorithm.

Further, the loop solution means 82 sets a flow entry for prohibiting packets forwarding on ports (such as non-representative ports) in the communication paths with the adjacent controller domain, and may create a communication tree for avoiding a loop configuration.

The communication control means 84 may calculate a plurality of paths, and conduct load distribution control (such as ECMP load balancing) on communication from a communication device connected to each OpenFlow switch into a plurality of paths.

Figure 10:
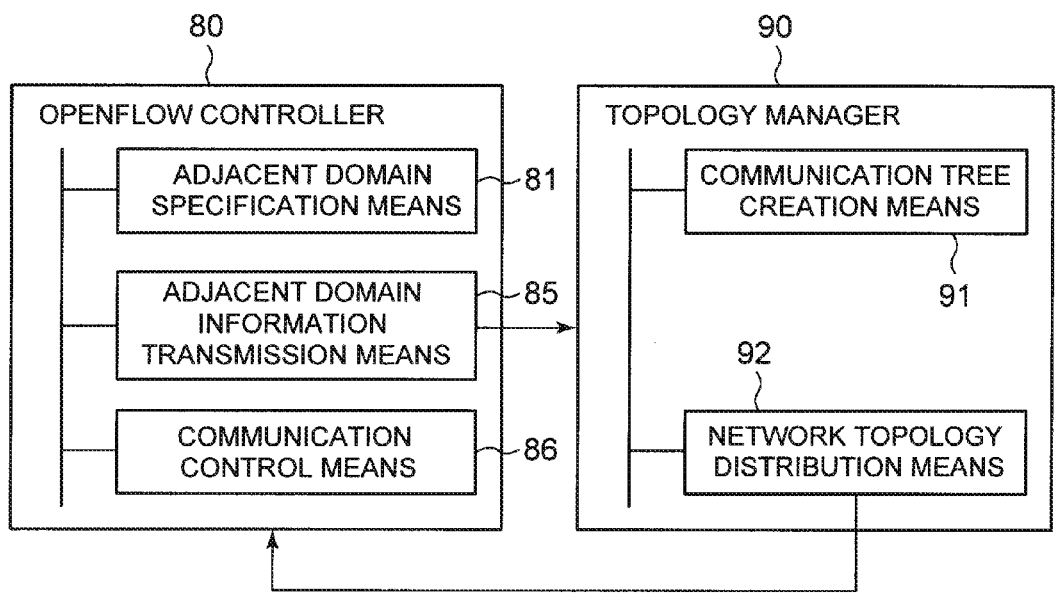
FIG. 10 It depicts a block diagram illustrating other outline of the communication control system according to the present invention.
Figure 11:
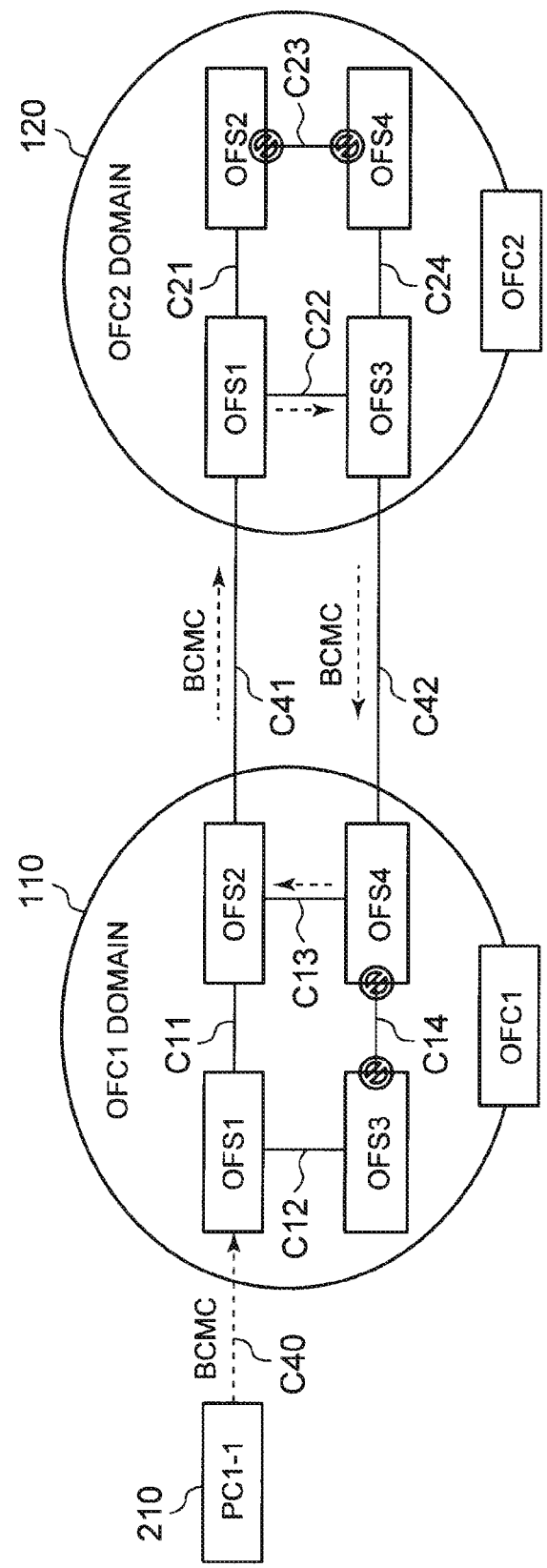
FIG. 11 It depicts an explanatory diagram illustrating an example that two OFC domains are connected via a plurality of lines.
Figure 12:
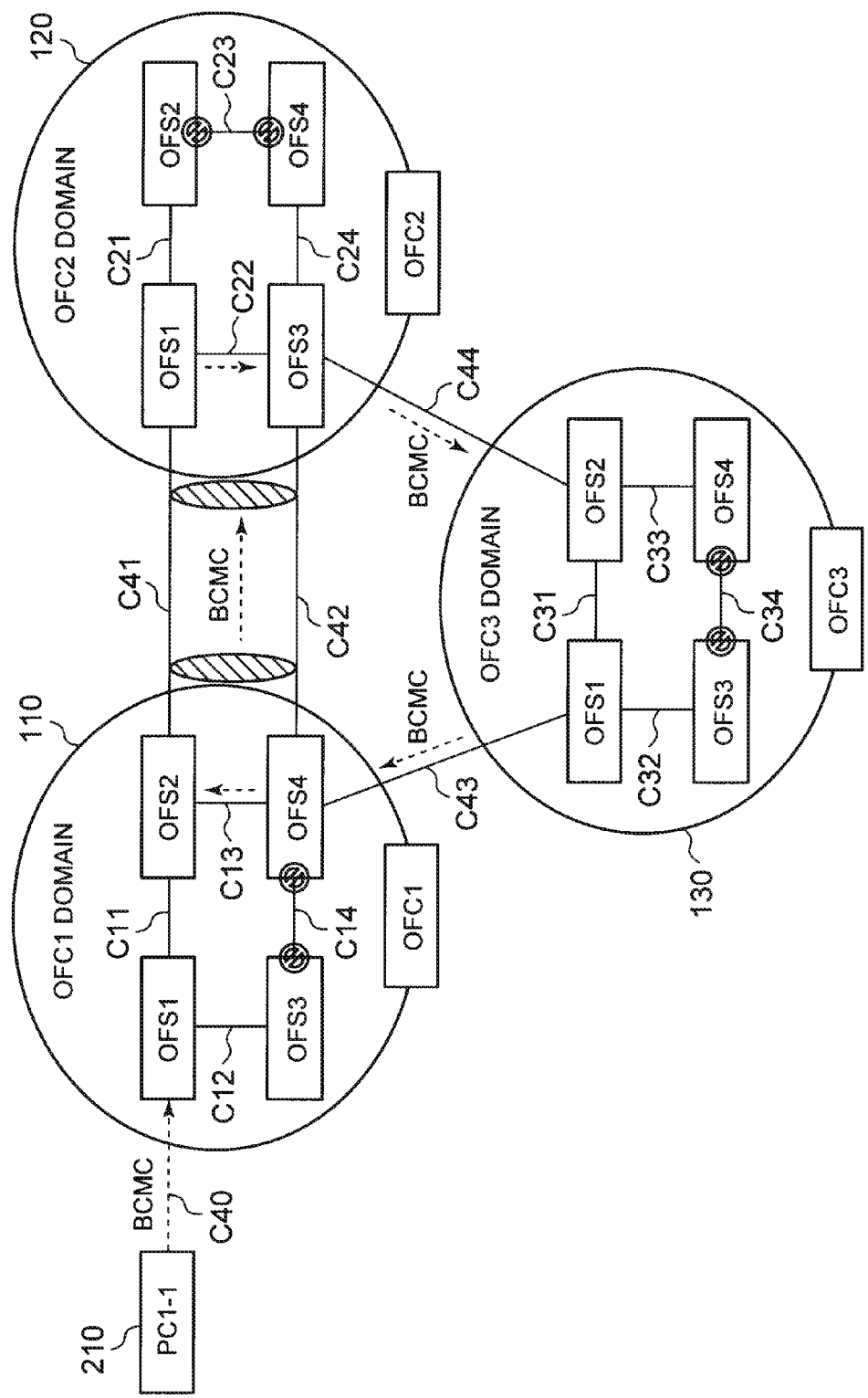
FIG. 12 It depicts an explanatory diagram illustrating an example that three OFC domains are connected.

FIG. 10 is a block diagram illustrating other outline of the communication control system according to the present invention. Other communication control system according to the present invention is directed for controlling communication among controller domains in a network in which the controller domains (such as OFC domains), each of which indicates a range where at least one or more OpenFlow switch (such as OFS1 to OFS4) is managed by each Open-Flow controller (OFC1 to OFC3, for example), are mutually connected, and includes a plurality of OpenFlow controllers 80 (such as OFC1 to OFC3), and a topology manager 90 (the topology manager 140, for example) connected such that communication from an OpenFlow controller reaches (for example, has an IP reach property) and directed for creating a communication tree indicating communication paths among the controller domains.

The OpenFlow controller 80 includes the adjacent domain specification means 81 (the inter-domain topology management module 21 according to the second exemplary embodiment, for example) which specifies a controller domain adjacent to the own controller domain, an adjacent domain information transmission means 85 (the inter-domain topology management module 21 according to the second exemplary embodiment, for example) which transmits the information on the specified adjacent controller domain to the topology manager, and a communication control means 86 (the path calculation module 10, for example) which calculates an optimum path based on a network topology calculated by the topology manager and controls communication from a communication device connected to each OpenFlow switch.

The topology manager 90 includes a communication tree creation means 91 (the control unit 141, for example) which specifies a network topology between controller domains based on the information received from the OpenFlow controllers 80, and creates a communication tree for avoiding a loop configuration present in communication paths with the adjacent controller domain, and a network topology distribution means 92 (the control unit 141, for example) for distributing the created communication tree to OpenFlow controllers.

Also with the structure, even when a physical loop is present among a plurality of connected OFC domains under an OpenFlow network environment, communication can be made by use of an optimum path without looping the communication.

The present invention has been described above with reference to the exemplary embodiments and the examples, but the present invention is not limited to the exemplary embodiments and the examples. The structure and details of the present invention can be variously changed within the scope of the present invention understandable to those skilled in the art.

The present application claims the priority based on Japanese Patent Application No. 2014-020390 filed on Feb. 5, 2014, the disclosure of which is all incorporated herein by reference.

REFERENCE SIGNS LIST

10 Path calculation module
11 MAC/destination domain table storage unit
12 MAC local table storage unit
13 Inter-domain topology information storage unit
20 Topology management module
21 Inter-domain topology management module
22 Internal domain topology management module
30 Message analysis module
40 Message transceiver module
100 OFC
110 OFC1 domain
120 OFC2 domain
130 OFC3 domain
210, 211, 212, 231, 232 PC

What is claimed is:

1. A communication control system for controlling communication among controller domains in a network in which the controller domains, each of which indicates a range in which at least one or more OpenFlow switch is managed by each OpenFlow controller, are mutually connected, the communication control system comprising:
hardware including a processor;
an adjacent domain specification unit implemented at least by the hardware and which specifies an adjacent controller domain to an own controller domain;
a loop solution unit implemented at least by the hardware and which creates a communication tree for avoiding a loop configuration present in communication paths with the adjacent controller domain;
a topology specification unit implemented at least by the hardware and which specifies a network topology between controller domains; and
a communication control unit implemented at least by the hardware and which calculates an optimum path based on the communication tree and controls communication from a communication device connected to each OpenFlow switch by use of the network topology;
wherein the adjacent domain specification unit transmits an adjacent confirmation packet for confirming an adjacent domain from an external port of the own controller domain, returns an adjacent response packet to the controller domain transmitting the adjacent confirmation packet when receiving the adjacent confirmation packet, and receives the adjacent response packet thereby to specify the adjacent controller domain.

2. The communication control system according to claim 1,
wherein the loop solution unit creates the communication tree for avoiding a loop configuration present in communication paths with the adjacent controller domain based on a spanning tree algorithm.

3. The communication control system according to claim 1,
wherein the loop solution unit sets a flow entry for prohibiting packet forwarding on ports in the communication paths with the adjacent controller domain, and creates the communication tree for avoiding the loop configuration.

4. The communication control system according to claim 1,
wherein the communication control unit calculates a plurality of paths, and conducts load distribution control on communication from a communication device connected to each OpenFlow switch into the plurality of paths.

5. A communication control system for controlling communication among controller domains in a network in which the controller domains, each of which indicates a range in which at least one or more OpenFlow switch is managed by each OpenFlow controller, are mutually connected, the communication control system comprising:
a plurality of OpenFlow controllers; and
a topology manager connected such that communication from the OpenFlow controllers reaches, and directed for creating a communication tree indicating communication paths among the controller domains,
wherein the OpenFlow controller includes
first hardware including a processor,
an adjacent domain specification unit implemented at least by the first hardware and which specifies an adjacent controller domain to an own controller domain,
an adjacent domain information transmission unit implemented at least by the first hardware and which transmits the information on the specified adjacent controller domain to the topology manager, and
a communication control unit implemented at least by the first hardware and which calculates an optimum path based on the network topology calculated by the topology manager, and controls communication from a communication device connected to each OpenFlow switch, and
the topology manager includes
second hardware including a processor,
a communication tree creation unit implemented at least by the second hardware and which specifies a network topology between controller domains based on the information received from the OpenFlow controllers, and creates a communication tree for avoiding a loop configuration present in communication paths with the adjacent controller domain, and
a network topology distribution unit implemented at least by the second hardware and which distributes the created communication tree to the OpenFlow controllers.

6. A communication control method for controlling communication among controller domains in a network in which the controller domains, each of which indicates a range in which at least one or more OpenFlow switch is managed by each OpenFlow controller, are mutually connected, the communication control method comprising:
specifying an adjacent controller domain to an own controller domain;
creating a communication tree for avoiding a loop configuration present in communication paths with the adjacent controller domain;
specifying a network topology between controller domains;
calculating an optimum path based on the communication tree and controlling communication from a communication device connected to each OpenFlow switch by use of the network topology; and
transmitting an adjacent confirmation packet for confirming an adjacent domain from an external port of the own controller domain when specifying the adjacent domain, returning an adjacent response packet to the controller domain transmitting the adjacent confirmation packet when receiving the adjacent confirmation packet, and receiving the adjacent response packet thereby to specify the adjacent controller domain.

* * * * *